(12) United States Patent
Mowery, Sr.

(10) Patent No.: US 7,664,363 B1
(45) Date of Patent: Feb. 16, 2010

(54) APPARATUS AND METHOD TO PROTECT FIBER RIBBONS

(76) Inventor: Arthur J. Mowery, Sr., 125 Flamingo Rd., Edgewater, FL (US) 32141

( * ) Notice: Subject to any disclaimer, the term of this patent is extended or adjusted under 35 U.S.C. 154(b) by 0 days.

(21) Appl. No.: 12/215,065

(22) Filed: Jun. 25, 2008

(51) Int. Cl.
*G02B 6/00* (2006.01)

(52) U.S. Cl. .................................................. 385/137

(58) Field of Classification Search ............... 385/134, 385/136, 137, 138
See application file for complete search history.

(56) References Cited

U.S. PATENT DOCUMENTS

| 5,283,853 | A |   | 2/1994  | Szegda |         |
|-----------|---|---|---------|--------|---------|
| 5,381,501 | A | * | 1/1995  | Cardinal et al. | 385/54 |
| 5,444,810 | A |   | 8/1995  | Szegda |         |
| 5,535,298 | A |   | 7/1996  | Fasnacht et al. | |
| 5,692,090 | A |   | 11/1997 | Szegda |         |
| 5,802,227 | A |   | 9/1998  | Dunn et al. | |
| 6,389,214 | B1 | * | 5/2002 | Smith et al. | 385/136 |
| 6,510,273 | B2 |   | 1/2003 | Ali et al. | |
| 6,623,173 | B1 |   | 9/2003 | Grois et al. | |
| 6,880,980 | B2 |   | 4/2005 | Kang et al. | |
| 2009/0103881 | A1 | * | 4/2009 | Gonzalez et al. | 385/137 |

* cited by examiner

*Primary Examiner*—Sarah Song
(74) *Attorney, Agent, or Firm*—Paul S. Rooy PA

(57) ABSTRACT

An apparatus and method to protect fiber ribbons. A router having a body and cap are disclosed. Fiber cable sheath is stripped from one end, and the fiber ribbons thus exposed are inserted through the body and through cap bores in the cap. The cap is frictionally pushed into the body, and transportation tubes are installed over the fiber ribbons. The cap bores are sized to frictionally admit one end of a transportation tube, which has the effect of holding the transportation tubes in place. An optional insert is disclosed which has the function of reducing the body minor barrel bore diameter through which the fiber cable enters the router.

9 Claims, 6 Drawing Sheets

APPARATUS AND METHOD TO PROTECT FIBER RIBBONS

BACKGROUND OF THE INVENTION

1. Field of the Invention

This invention relates to fiber cables, and in particular to an apparatus and method to protect fiber ribbons.

2. Background of the Invention

Fiber cable was invented in the early 1970s, and its use has grown to include telecommunications, medicine, military, automotive, and industrial. Telecommunications applications include global networks, local telephone exchanges, subscribers' homes, and desktop computers, and carry voice, data, or video over distances of ranging from a few feet to hundreds of miles.

Optical fiber is frequently used for transmission of data signals in private networks, such as exist in manufacturing firms, banks, universities, financial firms, and more. These entities have a need for secure, reliable systems to transfer computer and monetary information between buildings to the desktop terminal or computer, and around the world. The security inherent in optical fiber systems is a major benefit. Cable television or community antenna television (CATV) companies find the high information-carrying capacity, or bandwidth, of fiber cable extremely useful in transmitting signals to subscribers.

Intelligent transportation systems also find great utility in fiber cable. Examples of these include smart highways with intelligent traffic lights, automated toll booths, and changeable message signs to give motorists information about delays and emergencies.

Fiber cables routinely carry hundreds of individual fibers. These fibers are grouped into discreet bundles called ribbons. For example, a single fiber cable may carry between 216 and 864 individual fibers. These individual fibers are typically grouped into a number of ribbons, for example, twelve ribbons. Strengthening members are also included in the fiber cable assembly, to provide the strength and stiffness necessary to protect the fibers from stretching and excessive bending.

A critical point in fiber cable systems is the location where a fiber cable containing a plurality of ribbons is split up into its component ribbons. Just as the strengthening members protect the individual fibers along the run of the fiber cable, a router is recommended to protect the individual ribbons once these emerge from the protection of the cable sheathing and strengthening members.

Thus, it would be desirable to provide an apparatus and method to protect fiber ribbons at the point where they emerge from the protection of the fiber cable.

Existing Designs

A number of designs have been proposed to support fiber ribbons exiting their fiber cable. These generally involve installing transportation tubes around the emergent ribbons, to support the ribbons.

U.S. Pat. Nos. 5,692,090 and 5,802,227 were granted Szegda and Dunn et al. respectively, for fiber optic cable end connectors. While these provided termination and support for the fiber cable, no provision was taught to support the individual fibers emerging from same, except one Szegda '090 embodiment taught support for a single central fiber ribbon.

U.S. Pat. Nos. 5,535,298, 6,510,273, 6,623,173 and 6,880,980 were granted Fasnacht et al, Ali et al, Grois et al., and Kang et al. respectively While these disclosed means to support fiber ribbons using transportation tubes, they suffered from the disadvantage of complexity, and therefore higher cost.

SUMMARY OF THE INVENTION

Accordingly, it is an object of the present invention to provide an apparatus and method to protect fiber ribbons which supports individual ribbons extending beyond a fiber cable sheath. Design features allowing this object to be accomplished include a router having a body minor barrel bore, a cap having cap bores, a fiber cable disposed within the body minor barrel bore, fiber ribbon disposed within at least one cap bore, and a transportation tube around each ribbon extending through the cap bores. Advantages associated with the accomplishment of this object include avoiding kinking, bending, and damage to the fiber ribbons, along with the consequent cost and maintenance savings.

It is another object of the present invention to provide an apparatus and method to protect fiber ribbons which provides a cover to each fiber ribbon. Design features allowing this object to be accomplished include a cable entering a router through a router minor barrel bore, fiber ribbons extending through router cap bores, and transportation tubes covering the fiber ribbons which extend through the cap bores. Benefits associated with the accomplishment of this object include avoidance of damage to the fiber ribbons, and the associated cost and maintenance savings.

It is still another object of this invention to provide an apparatus and method to protect fiber ribbons which supports individual ribbons extending beyond a fiber cable sheath. Design features allowing this object to be accomplished include a router having a body minor barrel bore, a cap having cap bores, a fiber cable disposed within the body minor barrel bore, fiber ribbon disposed within at least one cap bore, and a transportation tube around each ribbon extending through the cap bores. Advantages associated with the accomplishment of this object include the reduction of repair costs, and the increase of reliability.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIGS. 1 and 2. Sheet two contains FIGS. 3 and 4. Sheet three contains FIGS. 5 and 6. Sheet four contains FIGS. 7-9. Sheet five contains FIGS. 10-12. Sheet six contains FIGS. 13 and 14.

DETAILED DESCRIPTION OF THE PREFERRED EMBODIMENT

Figure 1:
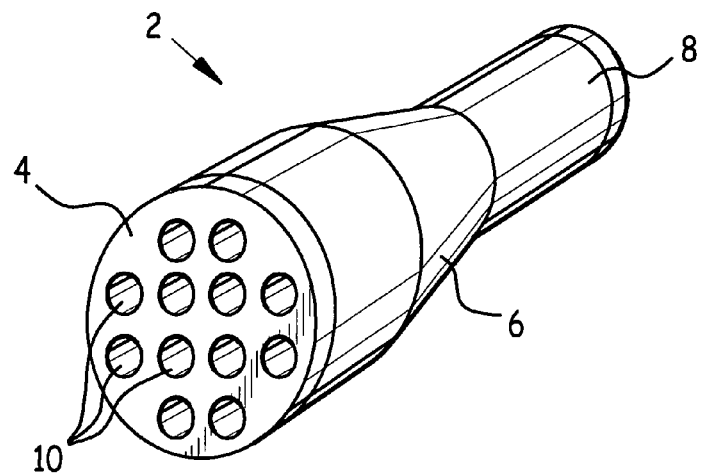
FIG. 1 is a front quarter elevated isometric view of a router.
Figure 2:
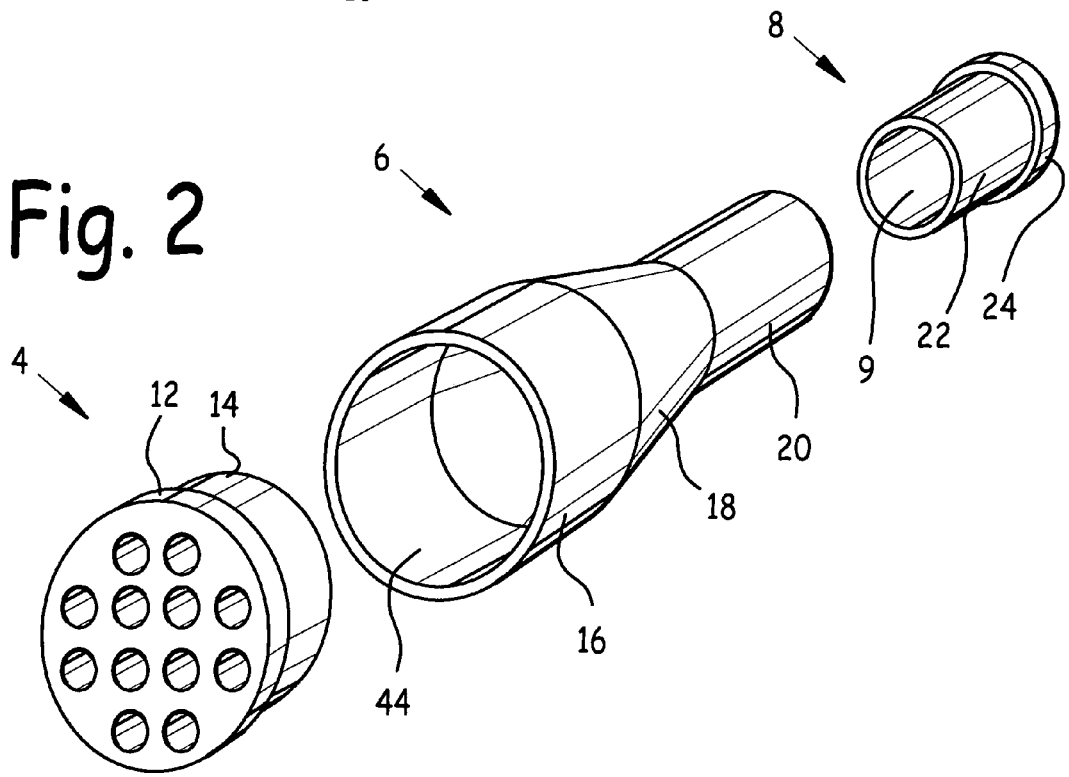
FIG. 2 is a front quarter elevated isometric view the component parts of a router.
Figure 3:
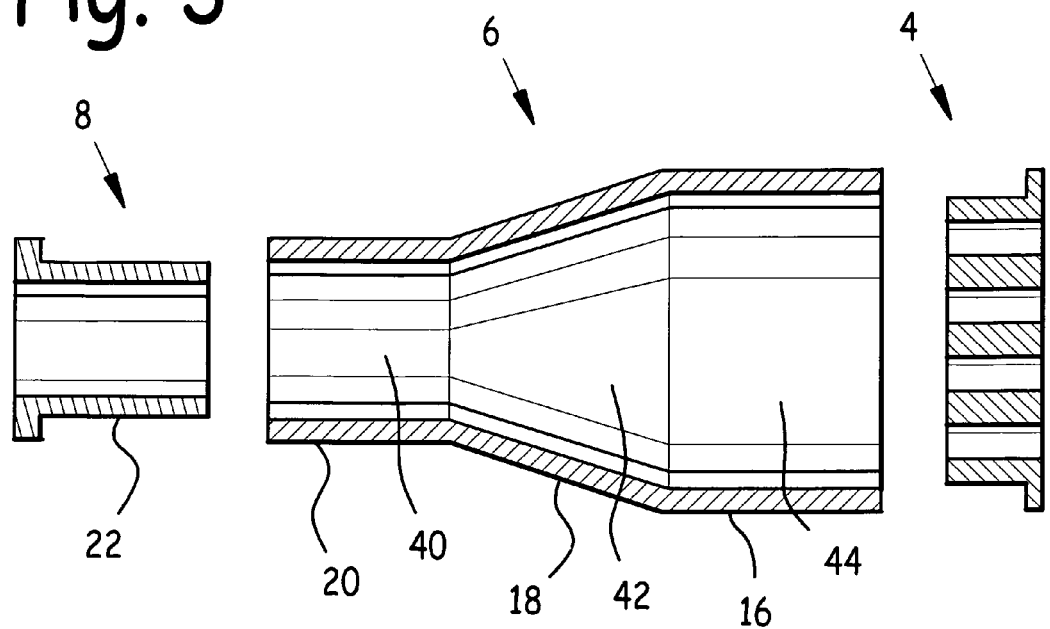
FIG. 3 is a side cross-sectional view of the component parts of a router.
Figure 4:
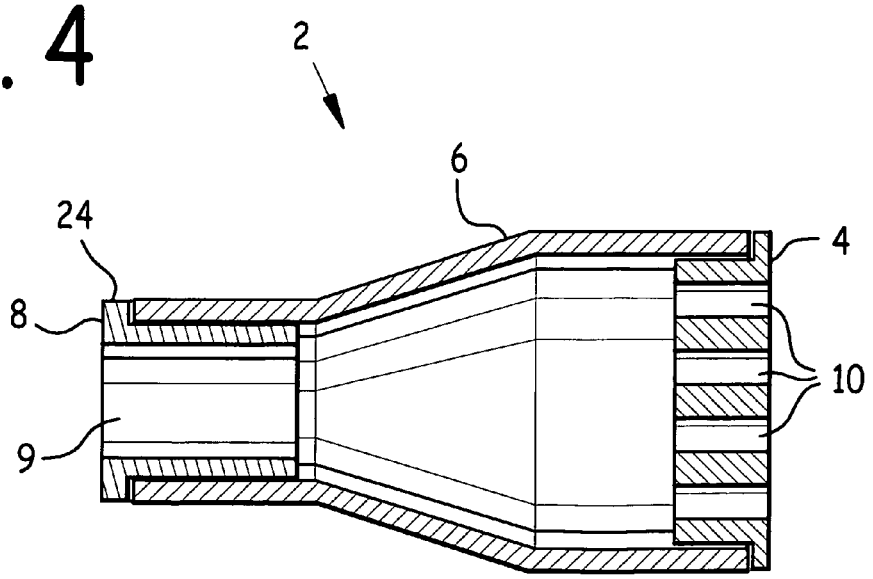
FIG. 4 is a side cross-sectional view of a router.

FIG. 1 is a front quarter elevated isometric view of router 2. FIG. 2 is a front quarter elevated isometric view the component parts of router 2. FIG. 3 is a side cross-sectional view of the component parts router 2. FIG. 4 is a side cross-sectional view of router 2.

Router 2 comprises cap 4, and optionally insert 8, frictionally inserted into body 6. Body 6 comprises body major barrel 16 rigidly attached to one end of body funnel 18, and body minor barrel 20 rigidly attached to an opposite end of body funnel 18. In the preferred embodiment, body major barrel 16 and body minor barrel 20 were substantially cylindrical, body funnel 18 was substantially a cone section, and body major barrel 16, body minor barrel 20, and body funnel 18 were substantially co-axial.

Body 6 comprises body minor barrel bore 40 in body minor barrel 20, body funnel bore 42 in body funnel 18, and body major barrel bore 44 in body major barrel 16. Body minor barrel bore 40, body funnel bore 42, and body major barrel bore 44 mutually communicate.

Cap 4 comprises cap barrel 12 and cap lip 14 disposed around one end of cap barrel 12. In the preferred embodiment, cap barrel 12 was a solid cylinder, and cap lip 14 was circular in cross-section, with an outside diameter greater than cap barrel 12.

Body major barrel bore 44 is sized to frictionally admit cap barrel 12. Cap lip 14 serves as a stop when cap barrel 12 is inserted into body major barrel bore 44, as may be observed in FIG. 4.

Figure 11:
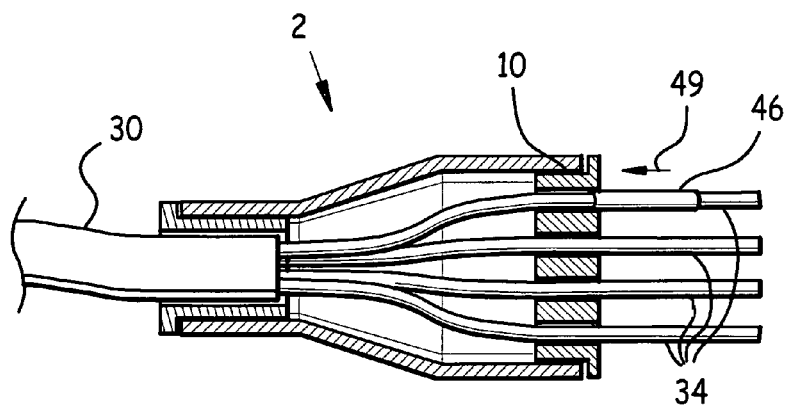
FIG. 11 is a side cross-sectional view of a router installed on a cable end, with the fiber ribbons extending through router cap bores, and a transportation tube installed over a fiber cable, with one end of the transportation tube frictionally pushed into a router cap bore.
Figure 12:
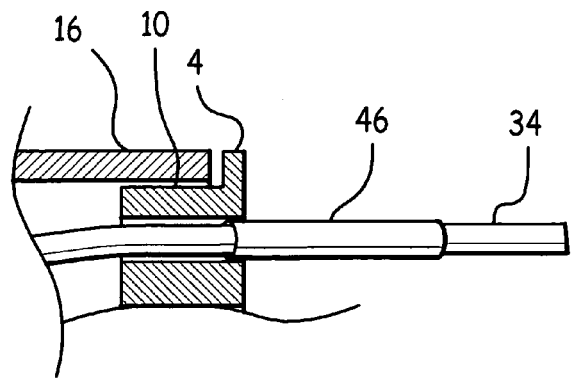
FIG. 12 is a close-up side cross-sectional view of fiber ribbon extending through a router cap bores, and a transportation tube installed over the fiber ribbon, with one end of the transportation tube frictionally pushed into the router cap bore.

Cap 4 further comprises a plurality of cap bores 10 extending axially through cap lip barrel 12. Cap bores 10 are sized to slidably admit fiber cable ribbons 34, and to frictionally admit an end of transportation tube 46, as is illustrated in FIGS. 11 and 12.

Insert 8 comprises insert barrel 22 and insert lip 24 disposed around one end of insert barrel 22. In the preferred embodiment, insert barrel 12 was a hollow cylinder having insert bore 9, and insert lip 24 circular in cross-section, with an outside diameter greater than insert barrel 22.

Body minor barrel bore 40 is sized to frictionally admit insert barrel 22. Insert lip 24 serves as a stop when insert barrel 22 is inserted into body minor barrel bore 40, as may be observed in FIG. 4.

Figure 5:
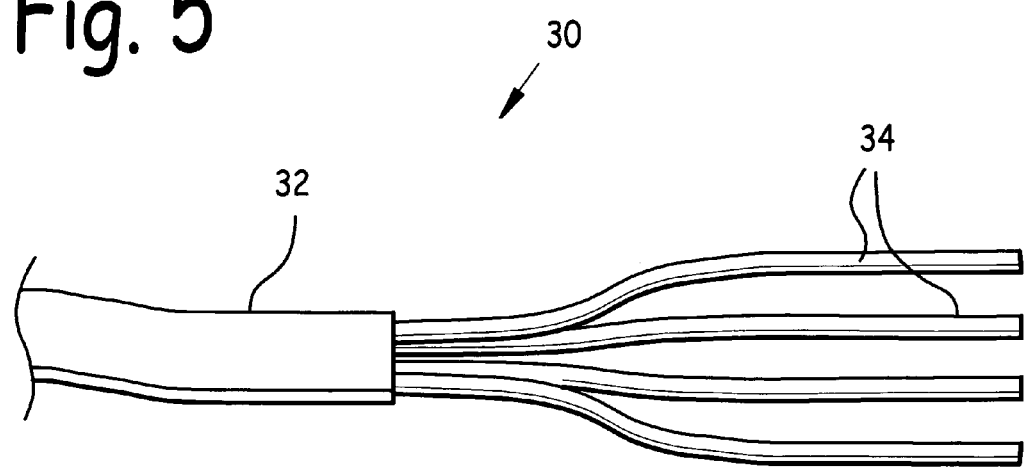
FIG. 5 is a side view of a fiber cable with part of its sheath stripped off.
Figure 6:
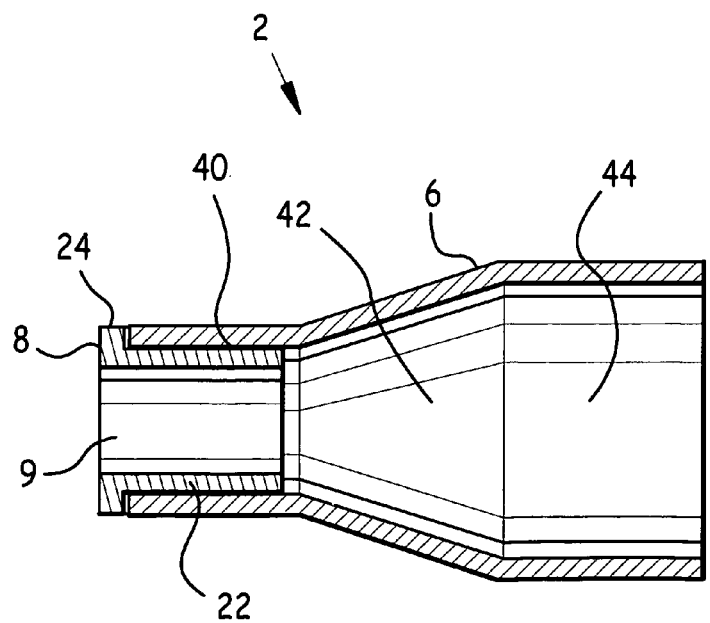
FIG. 6 is a side cross-sectional view of a router body with a router insert installed in its router body minor barrel bore.
Figure 7:
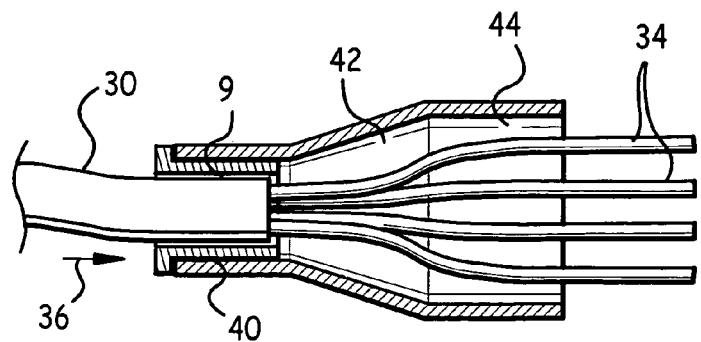
FIG. 7 is a side cross-sectional view of a fiber cable inserted through a router.

FIGS. 5-14 illustrate the instant method to protect fiber ribbons. FIG. 5 is a side view of fiber cable 30 with part of its sheath 32 stripped off. FIG. 6 is a side cross-sectional view of router body 6 with router insert 8 installed in router body minor barrel bore 40. FIG. 7 is a side cross-sectional view of fiber cable 30 with bared fiber ribbons 34 inserted through insert 8 and body 6 as indicated by arrow 36.

Figure 8:
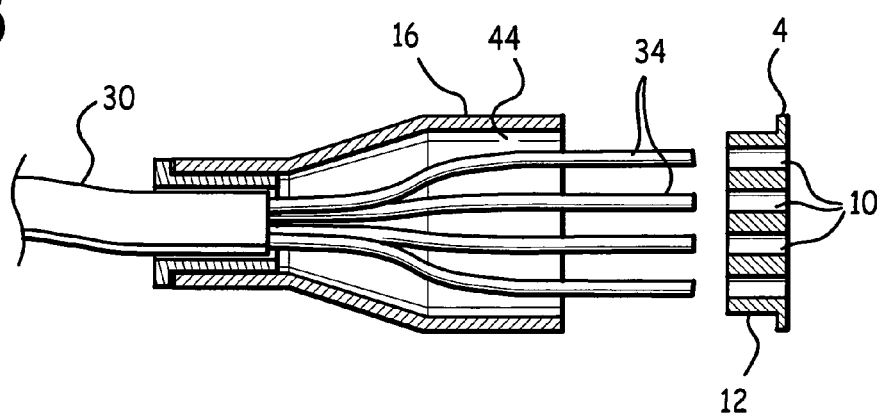
FIG. 8 is a side cross-sectional view of a fiber cable inserted through a router with its fiber ribbons extending beyond the router major barrel, and a router cap ready to be installed.
Figure 9:
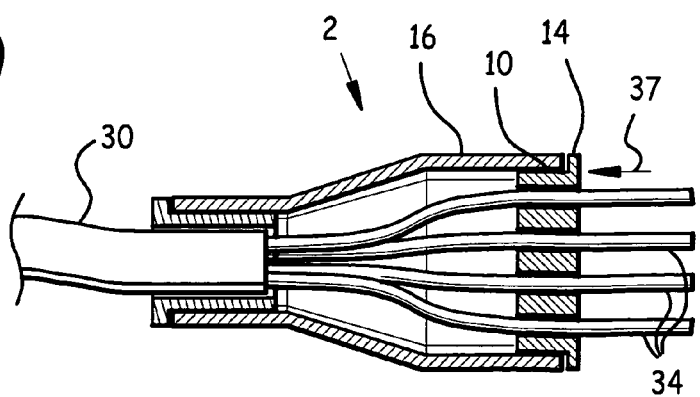
FIG. 9 is a side cross-sectional view of a fiber cable inserted through a router with its fiber ribbons extending beyond the router major barrel, and a router cap installed on the router body with the fiber ribbons extending through router cap bores.

FIG. 8 is a side cross-sectional view of fiber cable 30 inserted through insert 8 and body 6 with fiber ribbons 34 extending beyond router body major barrel 16, and router cap 4 ready to be installed. FIG. 9 is a side cross-sectional view of fiber cable 30 inserted through router 2 with fiber ribbons 34 extending beyond router body major barrel 16, and router cap 10 installed on router body 6 as indicated by arrow 37, with fiber ribbons 34 extending through router cap bores 10.

Figure 10:
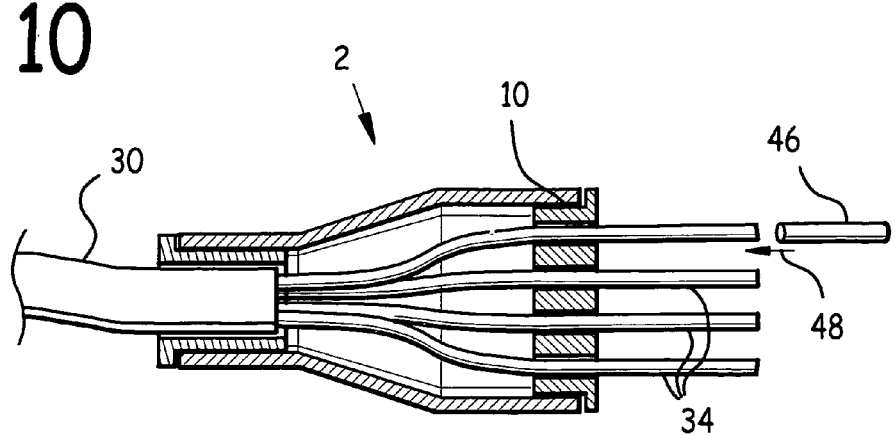
FIG. 10 is a side cross-sectional view of a router installed on a cable end, with the fiber ribbons extending through router cap bores, and a transportation tube poised, ready to be installed over a fiber cable.

FIG. 10 is a side cross-sectional view of router 2 installed on an end of cable 30, with fiber cables 34 extending through router cap bores 10, and a transportation tube 46 poised, ready to be installed over a fiber cable 34 as indicated by arrow 48. FIG. 11 is a side cross-sectional view of router 2 installed on an end of cable 30, with fiber ribbons 34 extending through router cap bores 10, and a transportation tube 46 installed over a fiber cable 34, with one end of transportation tube 46 frictionally pushed into a router cap bore 10. FIG. 12 is a close-up side cross-sectional view of router 2 installed on an end of cable 30, with fiber ribbons 34 extending through router cap bores 10, and a transportation tube 46 installed over a fiber ribbon 34, with one end of transportation tube 46 frictionally pushed into a router cap bore 10.

As depicted in FIGS. 5-12, the instant method to protect fiber ribbons starts with stripping sheath 32 from fiber cable 30 in conventional fashion. FIG. 6 illustrates the optional step of installing insert 8 into body 6 by pushing insert barrel 22 frictionally into body minor barrel bore until insert lip 24 butts up against the end of body minor barrel 20. Insert 8 is used as necessary to reduce the entrance diameter into router 2 to accommodate smaller diameter fiber cables 30. Where the diameter of fiber cable 30 is too large to fit into insert bore 9, insert 8 is simply omitted from router 2, and the step of installing insert 8 in body 6 is omitted from the instant method.

FIGS. 4-12 depict the optional case where insert 8 is used. If the diameter of fiber cable 30 is too great to slidably fit through insert bore 9, then insert 8 is omitted, and cable 30 is slid directly through body minor barrel bore 40. In this case, where insert 8 is omitted, references to insert bore 9 should be changed to body minor barrel bore 40.

FIG. 7 shows the step of inserting cable 30 through body minor barrel bore 40 (or insert bore 9, if insert 9 is used), body funnel bore 42, and body major barrel bore 44, until ribbons 34 emerge from body major barrel bore 44, and part of cable 30 covered by sheath 32 rests within body minor barrel bore 9, as indicated by arrow 36.

Next, cap 4 is installed on body 6 as depicted in FIGS. 8 and 9: each ribbon 34 is slid through a respective cap bore 10, and cap barrel 12 is frictionally pushed into body major barrel bore 44 as indicated by arrow 37 until cap lip 14 butts up against body major barrel 16, as depicted in FIG. 8.

A transportation tube 46 is then slid over each fiber ribbon as indicated by arrow 48 in FIG. 10. Each cap bore 10 is sized to frictionally admit an end of a transportation tube 46. Thus, when a transportation tube 46 is slid over a fiber ribbon 34 and into a cap bore 10, the frictional fit between the cap bore 10 and the transportation tube 46 serves to hold the transportation tube 46 in position covering the fiber ribbon 34, as shown in FIGS. 11 and 12.

After the above steps, the end of each fiber ribbon 34 opposite router 2 may be connected to further fiber components, for example in a splice tray. Although FIGS. 3-12 depict four fiber ribbons 34 in four cap bores 10, it is intended to fall within the scope of this disclosure that cap 4 incorporate any desired number of cape bores 10, each capable of accommodating a fiber ribbon 34.

Figure 13:
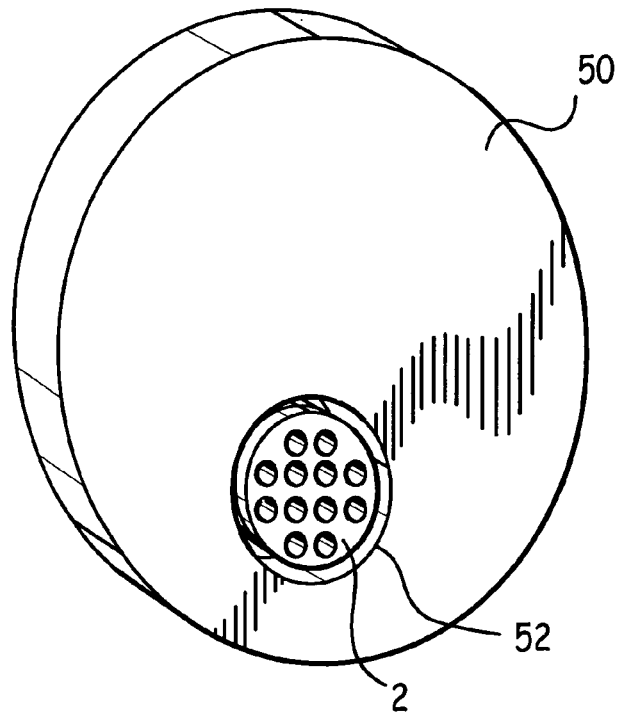
FIG. 13 is a front quarter elevated view of a router being installed through a fiber closure base aperture.
Figure 14:
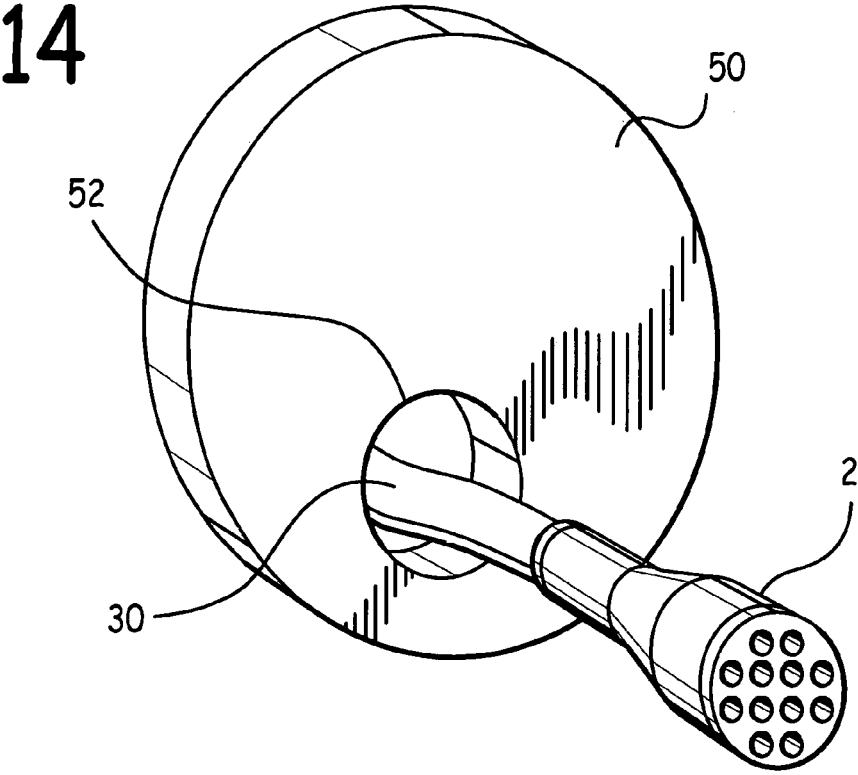
FIG. 14 is a front quarter elevated view of a router installed through a fiber closure base aperture.

FIG. 13 is a front quarter view of router 2 being installed through a fiber closure base aperture 52 in fiber closure base 50, a common routing of cable 30. FIG. 14 is a front quarter view of a router 2 installed through a fiber closure base aperture 52. These figures depict the optional step of inserting router 2 through a fiber closure base aperture 52 in fiber closure base 50. In the interest of clarity, fiber ribbons 23 and transportation tubes 46 are not shown in these figures.

Thus, the instant method comprises the steps of:

A. Providing a router 2 comprising a body 6 and a cap 4, the body comprising a body minor barrel 20 rigidly attached to one end of a body funnel 18 and a body major barrel 16 attached to an opposite end of the body funnel 18, a body minor barrel bore 40 in the body minor barrel 20, a body funnel bore 42 in the body funnel 18, and a body major barrel bore 44 in the body major barrel 16, the body minor barrel bore 40, body funnel bore 42, and body major barrel bore 44 mutually communicating, the cap 4 comprising a cap barrel 12, a cap lip 14 disposed around one end of the cap barrel 12, and at least one cap bore 10 extending through the cap barrel 12, the body major barrel bore 44 being sized to frictionally admit the cap barrel 12;

B. Stripping sheath 32 off an end of a fiber cable 30;

C. Inserting the end of the fiber cable 30 through the body minor barrel bore 40, body funnel bore 42, and body major barrel bore 44;

D. Slidably inserting at least one fiber ribbon 34 into a corresponding cap bore 10; and E. Frictionally inserting the cap barrel 12 into the body major barrel bore 44.

The above method may comprise the additional steps of providing at least one transportation tube 46 sized to slidably admit a fiber ribbon 34 and having at least one end which frictionally fits into a cap bore 10, sliding the transportation tube 46 over a fiber ribbon 34, and frictionally sliding one end of the transportation tube 46 into a cap bore 10.

The above method may comprise the additional steps of providing an insert 8 comprising an insert barrel 22 having an insert barrel bore 9, and an insert lip 24 disposed around one end of the insert barrel 22, the body minor barrel bore 40 being sized to frictionally admit the insert barrel 22, frictionally pushing the insert barrel 22 into the body minor barrel bore 40, and slidably inserting the fiber cable 30 through the insert bore 9.

The above method may comprise the additional steps of providing a fiber closure base 50 having a fiber closure base aperture 52 sized to admit the router 2, and sliding the router 2 through the fiber closure base aperture 52.

In the preferred embodiment, insert 8, body 6 and cap 4 were made of nylon, plastic, or other appropriate material. Fiber cable, fiber ribbons 34, and transportation tubes 46 were standard, off-the-shelf items.

While a preferred embodiment of the invention has been illustrated herein, it is to be understood that changes and variations may be made by those skilled in the art without departing from the spirit of the appending claims.

DRAWING ITEM INDEX 2 router
4 cap
6 body
8 insert
9 insert bore
10 cap bore
12 cap barrel
14 cap lip
16 body major barrel
18 body funnel
20 body minor barrel
22 insert barrel
24 insert lip
30 fiber cable
32 sheath
34 ribbon
36 arrow
37 arrow
40 body minor barrel bore
42 body funnel bore
44 body major barrel bore
46 transportation tube
48 arrow
49 arrow
50 fiber closure base
52 fiber closure base aperture

I claim:

1. An apparatus to protect fiber ribbons comprising a body, a cap, and an insert;

said body comprising a body minor barrel rigidly attached to one end of a body funnel and a body major barrel attached to an opposite end of said body funnel from said body minor barrel, a body minor barrel bore in said body minor barrel, a body funnel bore in said body funnel, and a body major barrel bore in said body major barrel, said body minor barrel bore, body funnel bore, and body major barrel bore mutually communicating;

said cap comprising a cap barrel, a cap lip disposed around one end of said cap barrel, and at least one cap bore extending through said cap barrel, said body major barrel bore being sized to frictionally admit said cap barrel, friction between said cap barrel and said body major barrel bore being sufficiently great to removably hold said cap barrel within said body major barrel bore, said cap lip serving as a stop when said cap barrel is inserted into said body major barrel bore;

said insert having an insert bore in an insert barrel, said body minor barrel bore being sized to frictionally admit said insert barrel, friction between said insert barrel and said body minor barrel bore being sufficiently great to removably hold said insert barrel within said body minor barrel bore.

2. The apparatus to protect fiber ribbons of claim 1 wherein said insert further comprises an insert lip disposed around one end of said insert barrel, whereby said insert lip serves as a stop when said insert barrel is inserted into said body minor barrel bore.

3. The apparatus to protect fiber ribbons of claim 2 further comprising at least one transportation tube, at least one end of said transportation tube being sized to frictionally fit into a corresponding said cap bore.

4. The apparatus to protect fiber ribbons of claim 2 wherein said insert barrel is substantially cylindrical.

5. An apparatus to protect fiber ribbons comprising a fiber cable, an insert, and a router comprising a body and a cap;

said body comprising a body minor barrel rigidly attached to one end of a body funnel and a body major barrel attached to an opposite end of said body funnel from said body minor barrel, a body minor barrel bore in said body minor barrel, a body funnel bore in said body funnel, and a body major barrel bore in said body major barrel, said body minor barrel bore, body funnel bore, and body major barrel bore mutually communicating;

said cap comprising a cap barrel, and at least one cap bore extending through said cap barrel, said body major barrel bore being sized to frictionally admit said cap barrel, friction between said cap barrel and said body major barrel bore being sufficiently great to removably hold said cap barrel within said body major barrel bore, part of said cap barrel disposed within said body major barrel;

said insert comprising an insert bore in an insert barrel, said body minor barrel bore being sized to frictionally admit said insert barrel, friction between said insert barrel and said body minor barrel bore being sufficiently great to removably hold said insert barrel within said body minor barrel bore, said insert barrel being disposed within said body minor barrel, said insert bore being sized to slidably admit said fiber cable;

said fiber cable comprising a plurality of fiber ribbons and sheath covering said fiber ribbons, said sheath being stripped off one end of said fiber cable, a portion of said cable being covered by said sheath being disposed within said insert barrel bore, and at least one said fiber ribbon extending through a respective said cap bore.

6. The apparatus to protect fiber ribbons of claim 5 further comprising at least one transport tube sized to admit one said fiber ribbon, said fiber ribbon being disposed within said transport tube, said at least one cap bore being sized to frictionally admit at least one end of said transport tube, said at least one transport tube end being frictionally disposed within one said cap bore.

7. A method to protect fiber ribbons comprising the steps of:

A. Providing a router comprising a body and a cap, said body comprising a body minor barrel rigidly attached to one end of a body funnel and a body major barrel attached to an opposite end of said body funnel, a body minor barrel bore in said body minor barrel, a body funnel bore in said body funnel, and a body major barrel bore in said body major barrel, said body minor barrel bore, body funnel bore, and body major barrel bore mutually communicating, said cap comprising a cap barrel and at least one cap bore extending through said cap barrel, said body major barrel bore being sized to frictionally admit said cap barrel;

B. Stripping sheath off an end of a fiber cable;

C. Inserting said end of said fiber cable through said body minor barrel bore, funnel bore, and body major barrel bore;

D. Slidably inserting at least one fiber ribbon into a corresponding cap bore; and E. Frictionally inserting said cap barrel into said body major barrel bore, wherein steps C, D and E are performed in the following sequential order: Step C, then Step D, then Step E;

F. Providing at least one transportation tube sized to slidably admit a fiber ribbon and having at least one end which frictionally fits into one said cap bore;

G. Sliding said transportation tube over one said fiber ribbon emerging from a respective cap bore; and H. Frictionally sliding one end of said transportation tube into said cap bore, wherein steps F, G, and H are performed after Step E.

8. A method to protect fiber ribbons comprising the steps of:

A. Providing a router comprising a body and a cap, said body comprising a body minor barrel rigidly attached to one end of a body funnel and a body major barrel attached to an opposite end of said body funnel, a body minor barrel bore in said body minor barrel, a body funnel bore in said body funnel, and a body major barrel bore in said body major barrel, said body minor barrel bore, body funnel bore, and body major barrel bore mutually communicating, said cap comprising a cap barrel and at least one cap bore extending through said cap barrel, said body major barrel bore being sized to frictionally admit said cap barrel;

B. Stripping sheath off an end of a fiber cable;

C. Inserting said end of said fiber cable through said body minor barrel bore, funnel bore, and body major barrel bore;

D. Slidably inserting at least one fiber ribbon into a corresponding cap bore; and E. Frictionally inserting said cap barrel into said body major barrel bore, wherein steps C, D and E are performed in the following sequential order: Step C, then Step D, then Step E;

F. Providing an insert comprising an insert barrel having an insert barrel bore, said body minor barrel bore being sized to frictionally admit said insert barrel, friction between said insert barrel and said body minor barrel bore being sufficiently great to removably hold said insert barrel within said body minor barrel bore; and G. Frictionally pushing said insert barrel into said body minor barrel bore, and slidably inserting said fiber cable through said insert bore.

9. The method to protect fiber ribbons of claim 8 comprising the further steps of providing an insert lip around one end of said insert barrel, and sliding said insert barrel into said body minor barrel bore until said inset lip butts up against said body minor barrel.

* * * * *